United States Patent Office 3,449,416
Patented June 10, 1969

3,449,416
PROCESS FOR THE PREPARATION OF ACID HALIDES
Thomas K. Brotherton, Charleston, W. Va., assignor to Union Carbide Corporation, a corporation of New York
No Drawing. Continuation-in-part of application Ser. No. 380,074, July 2, 1964. This application Apr. 20, 1965, Ser. No. 449,645
Int. Cl. C07c 51/58, 63/24
U.S. Cl. 260—544
8 Claims This is a continuation-in-part of application Ser. No. 380,074, filed July 2, 1964, now abandoned.

This invention relates to a novel, improved process for the preparation of acid halides. More particularly, this invention relates to a novel catalytic process for production of acid halides from carboxylic acids or acid anhydrides.

Heretofore, acid halides, particularly the halides of dicarboxylic acids, have been prepared by a variety of known methods. For example, it has been reported in the literature that fumaroyl chloride was first prepared by the reaction of fumaric acid with phosphorus pentachloride or thionyl chloride. Maleic acid has also been reacted with phosphorus pentachloride to give fumaroyl chloride. More recently, fumaroyl chloride has been prepared by reacting phosgene with fumaric acid in the presence of a formamide catalyst. Additionally, it has been reported that acid chlorides have been prepared, (1) from the corresponding acid anhydrides by the reaction with carbon tetrachloride in the presence of zinc, aluminum or other catalysts at temperatures in the range of from 200–300° C., (2) by the reaction of an alkali metal salt of a carboxylic acid with an alkyl polychloride in the absence of a catalyst, and (3) by reaction of a carboxylic acid with an alkyl polychloride employing as catalyst an oxide of molybdenum, tungsten, silicon or aluminum or a molybdenum or tungsten acid salt. However, each of the aforementioned procedures has not been without its disadvantages. In most instances, the yields of the desired acid halide obtained by known methods have not been economically attractive for commercial operation. Additionally, many of the processes require the use of special equipment, separation techniques or recovery methods, which detract from the efficiency and add to the overall cost of the process.

It is therefore an object of this invention to provide a novel process for the preparation of acid halides. A further object of this invention is to provide a novel process for preparation of acid halides by reaction of carboxylic acids or acid anhydrides with a halocarbon utilizing an iron compound as catalyst. Another object of this invention is to provide a novel process for the preparation of acid chlorides from acid anhydrides and chlorocarbons in the presence of an iron catalyst. A further object of this invention is to provide a novel process for the preparation of acid chlorides from carboxylic acids and chlorocarbons in the presence of an iron catalyst. A still further object of this invention is to provide a novel process for the preparation of acid chlorides in relatively high yields and efficiency. Yet another object is to provide a novel process for the preparation of fumaroyl chloride from maleic anhydride and carbon tetrachloride in the presence of ferric chloride. A further object is to provide a novel process for the preparation of isophthaloyl chloride from isophthalic acid and carbon tetrachloride in the presence of ferric chloride. These and other objects will readily become apparent to those skilled in the art in light of the teachings herein set forth.

In accordance with the present invention, there is provided an improved process from the preparation of acid halides, particularly acid chlorides, from carboxylic acids or acid anhydrides. The improved process comprises contacting controlled mole ratios of a carboxylic acid or acid anhydride with a halocarbon, such as carbon tetrachloride, in the presence of a catalytic amount of an iron catalyst.

The carboxylic acids which may be employed in practicing the present invention are the aromatic and cycloaliphatic carboxylic acids of 7 to about 24 carbon atoms containing 1 to 3 carboxyl groups. Illustrative of the suitable aromatic carboxylic acids one can mention benzoic acid, isophthalic acid, terephthalic acid, phenylacetic acid, β-phenyl acrylic acid, salicylic acid, trimesic acid, diphenic acid, o-aminobenzoic acid hydrochloride, 1-naphthalene acetic acid, 1-anthracene acetic acid, and the like. Illustrative of the suitable cycloaliphatic carboxylic acids one can mention hexahydrobenzoic acid, hexahydroisophthalic acid, 5-norbornene-2,3-dicarboxylic acid, cyclobutane carboxylic acid, hexahydrophthalic acid, cyclopentane carboxylic acid, cyclopentane-1,3-dicarboxylic acid, and the like.

The suitable acid anhydrides for the purposes of this invention are anhydrides of the general formula:

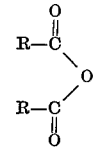

wherein each R represents an organic radical such as a hydrocarbon group, or both R's taken together can form a carbocyclic ring with the two carbon atoms to which they are attached. In those instances wherein the R groups are part of a ring system, for example, maleic anhydride, the resulting acid halide groups will, of course, be attached to the same molecule. Particularly suitable acid anhydrides are those having a cycloaliphatic or aromatic group. Thus, the R radicals in the above formula when taken together can represent alkylene, alkenylene, cycloalkylene, cycloalkenylene, arylene or like divalent, saturated and unsaturated radicals. Preferably the number of carbon atoms in the R groups is from 1 to 24 and more preferably 1 to 12.

Illustrative acid anhydrides which can be employed include, among others, 5-norbornene-2,3-dicarboxylic anhydride, pyromellitic dianhydride, glutaric anhydride, propionic anhydride, 2-methylpropionic anhydride, 3-methylpentanoic anhydride, ethanoic propanoic anhydride, butanoic propanoic anhydride, propanoic 2-methylpropanoic anhydride, ethanoic 3-methylpentanoic anhydride, chloromaleic anhydride, chlorendic anhydride, isobutyric anhydride, 3-methylpentanoic anhydride, and the like.

By conducting the reaction in the manner hereinafter indicated, it has been found that the desired acid halide can be conveniently obtained in yields as high as 90 to 98 percent, and higher. In contrast, the known methods of the prior art provide relatively low yields or suffer from one or more disadvantages which renders them largely unsuitable for efficient and economic operation.

It has been observed that the yield of the desired acid halide obtained by the process of this invention is critically dependent upon both the particular catalyst employed and the ratio of reactants. Each of these two factors are determinative of the yield and efficiency with which the acid halide is produced.

Experimental data has confirmed that ferric chloride is the only effective compound for catalyzing the carboxylic acid-halocarbon or acid anhydride-halocarbon reaction to the desired efficiency and yields. Thus, the iron catalysts for use in the process of this invention are ferric chloride and iron compounds capable of generating ferric chloride in situ, i.e., iron compounds capable of forming ferric chloride under the reaction conditions of process. Illustrative of such iron compounds one can mention ferric oxide, ferrous oxide, ferric hydroxide, ferrous hydroxide, ferric nitrate, ferrous nitrate, ferric acetate, ferrous acetate, ferric oxalate, ferrous oxalate, ferric bromide, ferrous bromide, metallic iron, and ferric chelates such as ferric acetonylacetonate. It is preferred to employ ferric chloride as the catalyst. Other compounds commonly exhibiting catalystic properties similar to those of ferric chrolide have been found to lack the necessary catalytic activity required to effectively promote the reaction to the desired high yield of acid halide.

The second critical feature of the instant process is the ratio of halocarbon to carboxylic acid or acid anhydride. Experimental evidence obtained in carrying out the reaction of carbon tetrachrolide and maleic anhydride under optimum conditions (2 percent $FeCl_3$ and 140° C. for 8 hours) indicated that when 1 mole excess of maleic anhydride was employed with carbon tetrachloride, a yield of only 49 percent was obtained at a carbon tetrachloride efficiency of 54 percent. In marked contrast, when a 400 percent excess of carbon tetrachloride was employed under the same conditions, a 90 percent yield of fumaroyl chloride was obtained. On the other hand, test results confirm that high yields can be obtained with carboxylic acids with somewhat lower proportions of halocarbon. In accordance with the present invention, when a carboxylic acid is employed in the process the mole ratio of halocarbon to carboxylic acid should be at least about 2 to 1 and when an acid anhydride is employed in the process the mole ratio of halocarbon to acid anhydride should be at least about 4 to 1.

In a preferred embodiment, the present invention is directed to the preparation of fumaroyl chloride from maleic anhydride and carbon tetrachloride in the presence of ferric chloride. In a second preferred embodiment, the present invention is directed to the preparation of isophthaloyl chloride from isophthalic acid and carbon tetrachloride in the presence of ferric chloride. These preferred processes provide high efficiencies and yields as high as 98 percent, based on the weight of the acidic reactant. The preferred process for the preparation of fumaroyl chloride is represented by the following reaction equation:

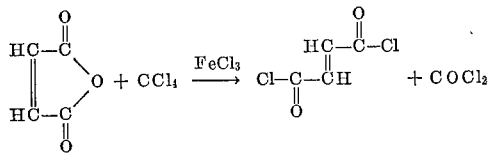

The preferred process for the preparation of isophthaloyl chloride is represented by the following reaction equations:

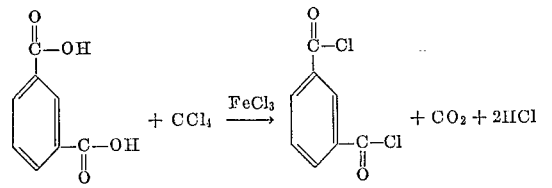

and/or

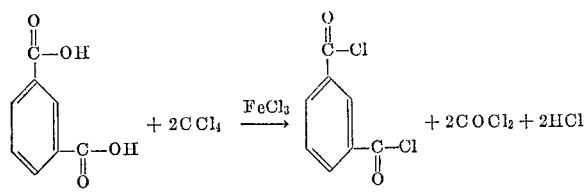

In addition to the preferred processes described above, the present invention is also highly useful in the synthesis of other acid halides, particularly acid chlorides. For example, acetyl chloride, succinoyl chloride, and phthaloyl chloride can be prepared in high yields from acetic anhydride, succinic anhydride, and phthalic anhydride respectively and benzoyl chloride and terephthaloyl chloride can be prepared in high yields from benzoic acid and terephthalic acid respectively. Further illustrative of the process of the invention is the preparation of 5-norbornene-2,3-dicarbonyl chloride from 5-norbornene-2,3-dicarboxylic anhydride, the preparation of glutaroyl dichloride from glutaric anhydride, the preparation of phenylacetyl chloride from phenylacetic acids, the preparation of hexahydroisophthaloyl chloride from hexahydroisophthalic acid, and so forth.

In practice, the iron catalyst is employed in a catalytic amount. By the term "catalytic amount" is meant that quantity of the iron catalyst which will effectively catalyze the reaction between the carboxylic acid or acid anhydride and the halocarbon to give the desired acid halide in high yields. In general, it has been found that a catalyst concentration, based on the weight of the carboxylic acid or acid anhydride, of from about 0.5 to about 10 percent, and more preferably from about 1 to about 4 percent, is satisfactory. Catalyst concentrations above and below the aforementioned ranges can also be employed but are less preferred. If desired, and depending upon the manner in which the reaction is carried out, the catalyst can be employed on an inert carrier, such as a molecular sieve, or other porous material.

Although carbon tetrachloride is the preferred halocarbon for use in the process of this invention, other halogenation agents wherein halogen is attached to an alkyl group can also be employed. For example, other chlorocarbons include chloroform, dichloromethane, hexachloroethane, tetrachloroethane, chlorinated propanes, butanes, pentanes, and the like. Preferred halocarbons are those containing from 1 to 6 carbon atoms and from 2 to 6 halogen atoms. It is also possible to prepare acid halides other than the chlorides by the process of the instant invention. For instance, a fluorinated hydrocarbon such as carbon tetrafluoride, can be employed to prepare the acid fluoride. Additionally, a fluorinated chlorocarbon can also be used.

The improved process of the present invention can be conducted in either the liquid or vaporous phase. Moreover, the process can be effected in either a batch or continuous manner. For example, the reactants can be fed continuously to a stainless steel tubular reactor containing the iron catalyst on an inert support and equipped with the necessary temperature and pressure controls. The desired residence time can be conveniently achieved by controlling the rate of reactants through the reactor.

Pressure is not necessarily critical and the reaction can be effected at atmospheric, subatmospheric, or superatmospheric pressures. For example, it was observed that a suitable pressure range is from about atmospheric to about 1000 pounds per square inch, while the preferred pressure range is from about atmospheric to about 300 pounds per square inch.

The operative temperature range for the preparation of the acid halides by the process of this invention is from about 50° C. to about 350° C. The preferred temperature range for the reaction of carbon tetrachloride and maleic anhydride is from about 75° C. to about 250° C., while the preferred temperature range for the reaction of carbon tetrachloride and isophthalic acid is from about 165° C. to about 250° C. Use of ferric chloride as catalyst and control of the mole ratio of reactants, in accordance with the teachings of this invention, permits effecting the desired high yields and efficiency, if desired, at temperatures well below the temperatures of 200° C. to 300° C., and higher, required to obtain even small yields of acid halide by certain of the methods of the prior art.

Reaction times of from several seconds to 12 hours are thoroughly practicable, with the preferred range being from 1 minute to about 5 hours. Shorter or longer periods can also be feasibly employed depending upon the temperature (higher temperatures usually permit the use of shorter reaction times), the carboxylic acid or acid anhydride used, and the manner in which the process is conducted, i.e., batchwise or continuous process.

A variety of inert, organic solvents can optionally be employed as diluents in the practice of the instant process, i.e., saturated aliphatic hydrocarbons, aromatic hydrocarbons, saturated aliphatic ethers, saturated cycloaliphatic ethers, and halogen substituted saturated aliphatic hydrocarbons. The presence of a solvent is most desirable, although not essential to control the reaction where a batch process is employed. However, the use of the large excess of carbon tetrachloride in most instances circumvents the need for a separate vehicle. Carbon tetrachloride is inert to the acid chlorides and serves both as reactant and solvent. The amount of solvent present can vary within wide limits, and while amounts up to about ten percent by volume of the total charge are usually preferred, amounts in excess of this can be employed. Thus, this limit is one of economic practicability. It is noted that the amount of diluent employed will also vary with the particular reactants and the manner in which the process is conducted.

The following examples are illustrative:

EXAMPLE 1

Preparation of fumaroyl chloride

A 3-liter Adkins-type rocker bomb was charged with 98 grams (1 mole) of maleic anhydride, 770 grams (5 moles) of carbon tetrachloride and 2.0 grams of anhydrous ferric chloride. The reaction mixture was heated at 140° C. for 8 hours. The autogeneous pressure that was formed was 110 pounds per square inch gauge. At the end of 8 hours, the mixture was cooled and the by-product phosgene collected in cold traps. Carbon tetrachloride was removed from the mixture by distillation at atmospheric pressure and, subsequently, about 138 grams (90% yield) of fumaroyl chloride was collected with a boiling range of 65–75° C. at a pressure of 20 millimeters of mercury.

EXAMPLE 2

Preparation of phthaloyl chloride

A 3-liter Adkins-type rocker bomb was charged with 149 grams (1 mole) of phthalic anhydride, 770 grams (5 moles) of carbon tetrachloride, and 4 grams of anhydrous ferric chloride. The reaction mixture was heated at 140° C. for 8 hours. The autogeneous pressure formed was 110 pounds per square inch. The resulting mixture was cooled, vented, and removed from the bomb. About 867 grams of reaction mixture was distilled, furnishing, after removal of carbon tetrachloride at atmospheric pressure, about 196 grams of phthaloyl chloride with a boiling point of 135° C. at 15 millimeter pressure. This corresponded to a yield of 96 percent.

EXAMPLE 3

Preparation of fumaroyl chloride

A 100-gallon stirred reactor was charged with 98 pounds of maleic anhydride, 650 pounds of carbon tetrachloride, and 2 pounds of anhydrous ferric chloride. The reaction mixture was heated to and maintained at 140° C. for 5 hours with stirring. By means of a motor valve, the autogeneous pressure was controlled at 100 pounds per square inch gauge. After cooling to 30° C. the residual phosgene was vented off and the unreacted carbon tetrachloride removed by distillation at atmospheric pressure. About 125 pounds of fumaroyl chloride with a purity of 99+% was then obtained in 82 percent yield by distillation.

EXAMPLE 4

In order to demonstrate the criticality of the ferric chloride catalyst in the process of the instant invention, a different trivalent metal halide, aluminum trichloride, was employed. A 3-liter Adkins-type rocker bomb was loaded with 98 grams of maleic anhydride, 770 grams of carbon tetrachloride and 2 grams of anhydrous aluminum chloride. The reaction mixture was heated and maintained at 140° C. for 8 hours. The autogeneous pressure formed was 95 pounds per square inch gauge. The resulting mixture was cooled at room temperature, vented, and about 720 grams of reaction mixture removed. After removing the carbon tetrachloride by distillation at atmospheric pressure, 39 percent of the charged amount of unreacted maleic anhydride was removed. No detectable quantity of fumaroyl chloride was obtained from the reaction.

The experiment was repeated using 2.0 grams of a copper and cuprous chloride catalyst in place of the aluminum chloride. Again no detectable quantity of fumaroyl chloride was obtained from the reaction.

EXAMPLES 5–9

In order to demonstrate the criticality of the ratio of reactants to the successful practice of the present invention, several experiments were conducted at varying concentrations of maleic anhydride and carbon tetrachloride. In each instance, the reaction was conducted at 140° C. for a period of eight hours in the presence of ferric chloride catalyst. The results of the experiments are set forth below in Table I:

TABLE I.—CRITICALITY OF CARBON TETRACHLORIDE, MALEIC ANHYDRIDE RATIO

| Example | Maleic anhydride (moles) | CCl⁴ (moles) | Percent ferric chloride | Press, p.s.i. | Percent yield |
|---|---|---|---|---|---|
| 5 | 2 | 0.9 | 1.0 | 135 | 46 |
| 6 | 1 | 5 | 2.0 | 110 | 90 |
| 7 | 1 | 2 | 2.0 | 140 | 74 |
| 8 | 2 | 1 | 2.0 | 180 | 46 |
| 9 | 2 | 1 | 2.0 | 110 | 49 |

EXAMPLE 10

Preparation of isophthaloyl chloride

A 3-liter Adkins-type rocker bomb was charged with 166 grams (1 mole) of isophthalic acid, 770 grams (5 moles) of carbon tetrachloride and 4.0 grams of anhydrous ferric chloride. The reaction mixture was heated to 175° C. over a period of 5 hours and then held at 175° C. for 3 hours. The autogenous pressure that was formed was 315 pounds per square inch gauge. At the end of 8 hours, the mixture was cooled and vented to atmosphere. Carbon tetrachloride was removed by distillation at atmospheric pressure and subsequently about 148 grams (73% yield) of isophthaloyl chloride was collected with a boiling range of 114–122° C. at a pressure of 2 to 4 millimeters of mercury.

EXAMPLE 11

Preparation of isophthaloyl chloride

Six 3-liter Adkins-type rocker bombs were charged with a total of 2656 grams (16 moles) of isophthalic acid, 8470 grams 55 (moles) of carbon tetrachloride and 54 grams of anhydrous ferric chloride. The reaction mixtures were heated to 175° C. for 8 to 10 hours. The autogenous pressure that was formed was about 350 pounds per square inch gauge. The mixture were cooled and vented to the atmosphere. Carbon tetrachloride was removed by distillation at atmospheric pressure, and subsequently about 2870 grams (88% yield) of isophthaloyl chloride was collected with a boiling range of 114–122° C. at a pressure of 2 to 4 millimeters of mercury.

EXAMPLE 12

Preparation of benzoyl chloride

A 3-liter Adkins-type rocker bomb was charged with 122 grams (1 mole) of benzoic acid, 770 grams (5 moles) of carbon tetrachloride and 3.0 grams of anhydrous ferric chloride. The reaction mixture was heated at 170° C.

for 8 hours. The autogenous pressure that was formed was 230 pounds per square inch gauge. At the end of 8 hours, the mixture was cooled and vented to atmosphere. Carbon tetrachloride was removed by distillation at atmospheric pressure and subsequently 102 grams of benzoyl chloride was collected with a boiling range of 80–100° C. at a pressure of 20 millimeters of mercury.

EXAMPLE 13

In order to demonstrate the criticality of the ferric chloride catalyst in the present process, Example 12 above was repeated using aluminum trichloride in place of ferric chloride. A 3-liter Adkins-type rocker bomb was charged with 122 grams (1 mole) of benzoic acid, 770 grams (5 moles) of carbon tetrachloride and 4.0 grams of anhydrous aluminum chloride. The reaction mixture was heated at 170° C. for 2.5 hours and then at 200° C. for 4.5 hours. The autogenous pressure that was formed was 145 pounds per square inch gauge. At the end of the reaction period, the mixture was cooled and vented to atmosphere and then the carbon tetrachloride was removed by distillation at atmospheric pressure. No detectable quantity of benzoyl chloride was obtained from the reaction.

EXAMPLE 14

Preparation of terephthaloyl chloride

Six 3-liter Adkins-type rocker bombs were charged with a total of 2572 grams (15.5) moles of terephthalic acid, 7160 grams (46.5 moles) of carbon tetrachloride and 60 grams of anhydrous ferric chloride. The reaction mixtures were heated to 175° C. for 6 to 8 hours. The autogenous pressure that formed was about 815 pounds per square inch gauge. The mixtures were cooled and vented to the atmosphere and subsequently about 2232 grams (71% yield) of terephthaloyl chloride was collected with a boiling range of 120–125° C. at a pressure of 2 to 4 millimeters of mercury.

Although the invention has been illustrated by the preceding examples, it is not to be construed as limited to the materials employed therein, but rather the invention encompasses the generic area as hereinbefore disclosed. Various modifications and embodiments of this invention can be made without departing from the spirit and scope thereof.

What is claimed is:

1. A process for the preparation of acid chlorides which comprises contacting carbon tetrachloride and an aromatic carboxylic acid of 7 to about 24 carbon atoms containing 1 to 3 carboxyl groups in the presence of a catalytic amount of ferric chloride said carbon tetrachloride and said aromatic carboxylic acid being present in a respective mole ratio of at least about 2 to 1.

2. A process for the preparation of acid chlorides which comprises contacting carbon tetrachloride and a cycloaliphatic carboxylic acid of 7 to about 24 carbon atoms containing 1 to 3 carboxyl groups in the presence of a catalytic amount of ferric chloride said carbon tetrachloride and said cycloaliphatic carboxylic acid being present in a respective mole ratio of at least about 2 to 1.

3. A process for the preparation of isophthaloyl chloride which comprises contacting carbon tetrachloride and isophthalic acid in the presence of a catalytic amount of ferric chloride, said carbon tetrachloride and said isophthalic acid being present in a respective mole ratio of at least about 2 to 1.

4. A process for the preparation of isophthaloyl chloride which comprises contacting carbon tetrachloride and isophthalic acid in the presence of a catalytic amount of ferric chloride at a temperature of from about 165° C. to about 250° C., said carbon tetrachloride and said isophthalic acid being present in a respective mole ratio of at least about 2 to 1.

5. A process for the preparation of isophthaloyl chloride which comprises contacting carbon tetrachloride and isophthalic acid in the presence of from about 0.5 to about 10 weight percent ferric chloride, based on the weight of isophthalic acid, at a temperature of from about 165° C. to about 250° C., said carbon tetrachloride and said isophthalic acid being present in a respective mole ratio of at least about 2 to 1.

6. The process of claim 5 wherein the ferric chloride is contained on an inert carrier.

7. The process of claim 5 wherein the reaction is conducted in a continuous manner.

8. The process of claim 5 wherein the reaction is conducted in an inert, organic solvent.

References Cited

UNITED STATES PATENTS

| 3,282,988 | 11/1966 | Renckhoff et al. | 260—544 |
| 3,282,989 | 11/1966 | Renckhoff et al. | 260—544 |
| 3,284,488 | 11/1966 | Renckhoff et al. | 260—544 |
| 2,051,096 | 8/1936 | Mares | 260—544 |
| 2,657,233 | 10/1953 | Carnahan | 260—544 |

OTHER REFERENCES

Hill, "J. Org. Chem.," vol. 25 (1960), pp. 1115–1118.

LORRAINE A. WEINBERGER, *Primary Examiner.*

JAMES NIELSEN, *Assistant Examiner.*

U.S. Cl. X.R.

260—408